US009736801B1

(12) United States Patent
Lambert

(10) Patent No.: US 9,736,801 B1
(45) Date of Patent: Aug. 15, 2017

(54) METHODS AND APPARATUS FOR SYNCHRONIZING DEVICES IN A WIRELESS DATA COMMUNICATION SYSTEM

(71) Applicant: Marvell International Ltd., Hamilton (BM)

(72) Inventor: Paul A. Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 25 days.

(21) Appl. No.: 14/281,671

(22) Filed: May 19, 2014

Related U.S. Application Data

(60) Provisional application No. 61/825,318, filed on May 20, 2013.

(51) Int. Cl.
*H04W 56/00* (2009.01)
*H04W 84/12* (2009.01)

(52) U.S. Cl.
CPC ....... *H04W 56/0015* (2013.01); *H04W 56/00* (2013.01); *H04W 84/12* (2013.01)

(58) Field of Classification Search
CPC ................................................ H04W 56/0015
See application file for complete search history.

(56) References Cited

U.S. PATENT DOCUMENTS

| 5,155,833 A | 10/1992 | Cullison et al. |
| 5,390,165 A | 2/1995 | Tuch |
| 5,467,398 A | 11/1995 | Pierce et al. |

(Continued)

FOREIGN PATENT DOCUMENTS

| CN | 88102647 | 12/1988 |
| CN | 1140272 | 1/1997 |

(Continued)

OTHER PUBLICATIONS

"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.

(Continued)

*Primary Examiner* — Jason Mattis

(57) ABSTRACT

The present disclosure describes methods and apparatus for synchronizing devices in a wireless data communication system. A wireless transceiver device of the wireless data communication system transmits a beacon at various intervals that includes both a timestamp indicating a current time and date of the transmitting wireless transceiver device, and a time quality indication indicating a quality of the time source of the transmitting wireless transceiver device. A wireless transceiver device receiving the beacon evaluates the time quality indication included in the beacon. If the time quality indication included in the beacon indicates the transmitting wireless transceiver device has a higher quality time source than the receiving wireless transceiver device, then the receiving wireless transceiver device adjusts its clock based on the timestamp in the beacon, otherwise the receiving wireless transceiver device need not adjust its clock based on the timestamp in the beacon.

24 Claims, 5 Drawing Sheets

(56) References Cited

U.S. PATENT DOCUMENTS

| | | |
|---|---|---|
| 5,469,506 A | 11/1995 | Berson et al. |
| 5,479,514 A | 12/1995 | Klonowski |
| 5,481,733 A | 1/1996 | Douglis et al. |
| 5,617,118 A | 4/1997 | Thompson |
| 5,673,416 A | 9/1997 | Chee et al. |
| 5,696,989 A | 12/1997 | Miura et al. |
| 5,771,356 A | 6/1998 | Leger et al. |
| 5,828,835 A | 10/1998 | Isfeld et al. |
| 5,884,099 A | 3/1999 | Klingelhofer |
| 5,991,519 A | 11/1999 | Benhammou et al. |
| 6,006,018 A | 12/1999 | Burnett et al. |
| 6,014,722 A | 1/2000 | Rudin et al. |
| 6,058,188 A | 5/2000 | Chandersekaran et al. |
| 6,092,108 A | 7/2000 | DiPlacido et al. |
| 6,145,069 A | 11/2000 | Dye |
| 6,167,514 A | 12/2000 | Matsui et al. |
| 6,216,230 B1 | 4/2001 | Rallis et al. |
| 6,230,277 B1 | 5/2001 | Nakaoka et al. |
| 6,330,626 B1 | 12/2001 | Dennin et al. |
| 6,389,538 B1 | 5/2002 | Gruse et al. |
| 6,463,509 B1 | 10/2002 | Teoman et al. |
| 6,473,861 B1 | 10/2002 | Stokes |
| 6,564,318 B1 | 5/2003 | Gharda et al. |
| 6,601,167 B1 | 7/2003 | Gibson et al. |
| 6,614,985 B1 | 9/2003 | Tokunaka et al. |
| 6,678,790 B1 | 1/2004 | Kumar |
| 6,704,872 B1 | 3/2004 | Okada |
| 6,711,447 B1 | 3/2004 | Saeed |
| 6,756,988 B1 | 6/2004 | Wang et al. |
| 6,799,271 B2 | 9/2004 | Kugai |
| 6,823,472 B1 | 11/2004 | DeKoning et al. |
| 6,832,280 B2 | 12/2004 | Malik et al. |
| 6,901,298 B1 | 5/2005 | Govindaraj et al. |
| 7,010,808 B1 | 3/2006 | Leung et al. |
| 7,035,827 B2 | 4/2006 | Ezaki |
| 7,036,018 B2 | 4/2006 | Horvat et al. |
| 7,069,439 B1 | 6/2006 | Chen et al. |
| 7,089,419 B2 | 8/2006 | Foster et al. |
| 7,103,788 B1 | 9/2006 | Souza et al. |
| 7,117,352 B1 | 10/2006 | Giles et al. |
| 7,126,913 B1 | 10/2006 | Patel et al. |
| 7,194,638 B1 | 3/2007 | Larky |
| 7,206,940 B2 | 4/2007 | Evans et al. |
| 7,210,038 B2 | 4/2007 | Walmsley |
| 7,266,842 B2 | 9/2007 | Foster et al. |
| 7,299,365 B2 | 11/2007 | Evans |
| 7,308,591 B2 | 12/2007 | Dubinsky |
| 7,333,464 B2 | 2/2008 | Yang et al. |
| 7,356,707 B2 | 4/2008 | Foster et al. |
| 7,370,349 B2 | 5/2008 | Holvey et al. |
| 7,373,506 B2 | 5/2008 | Asano et al. |
| 7,376,976 B2 | 5/2008 | Fierstein et al. |
| 7,496,952 B2 | 2/2009 | Edwards et al. |
| 7,499,548 B2 | 3/2009 | Meandzija et al. |
| 7,511,636 B2 | 3/2009 | Takahashi |
| 7,516,325 B2 | 4/2009 | Willey |
| 7,522,726 B2 | 4/2009 | Ishiguro et al. |
| 7,536,558 B2 | 5/2009 | Neble et al. |
| 7,549,056 B2 | 6/2009 | Carr |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,620,784 B2 | 11/2009 | Panabaker |
| 7,676,040 B2 | 3/2010 | Augenstein et al. |
| 7,725,738 B1 | 5/2010 | Langhammer et al. |
| 7,743,260 B2 | 6/2010 | Fetik |
| 7,774,635 B2 | 8/2010 | Shiota |
| 7,788,670 B2 | 8/2010 | Bodas et al. |
| 7,813,326 B1 | 10/2010 | Kelm et al. |
| 7,818,389 B1 | 10/2010 | Chiang et al. |
| 7,835,725 B2 | 11/2010 | Suzuki et al. |
| 7,865,733 B2 | 1/2011 | Goto et al. |
| 7,873,841 B2 | 1/2011 | Mullis, II et al. |
| 7,898,857 B2 | 3/2011 | Kirsch et al. |
| 7,900,060 B2 | 3/2011 | Hodzic |
| 7,916,594 B2 | 3/2011 | Yang |
| 7,991,943 B2 | 8/2011 | Berenbaum et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,094,822 B2 | 1/2012 | Suzuki |
| 8,095,816 B1 | 1/2012 | Chan |
| 8,117,478 B2 | 2/2012 | Liu et al. |
| 8,139,521 B2 | 3/2012 | Mukherjee et al. |
| 8,166,309 B2 | 4/2012 | Muralidharan et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 8,418,242 B2 | 4/2013 | Zhang et al. |
| 8,423,789 B1 | 4/2013 | Poo et al. |
| 8,437,290 B2 | 5/2013 | Kalhan |
| 8,443,187 B1 | 5/2013 | Orr |
| 8,443,211 B2 | 5/2013 | Zhao et al. |
| 8,483,718 B2 | 7/2013 | Hwang |
| 8,510,560 B1 | 8/2013 | Lambert et al. |
| 8,576,961 B1 | 11/2013 | Zhu et al. |
| 8,645,716 B1 | 2/2014 | Dujari et al. |
| 8,688,968 B2 | 4/2014 | Chu et al. |
| 8,694,782 B2 | 4/2014 | Lambert |
| 8,839,016 B2 | 9/2014 | Zhang et al. |
| 8,843,686 B1 | 9/2014 | Chan et al. |
| 9,009,778 B2 | 4/2015 | Pearce et al. |
| 9,141,394 B2 | 9/2015 | Sakarda |
| 9,220,012 B1 | 12/2015 | Inamdar |
| 9,253,175 B1 | 2/2016 | Orr |
| 9,363,249 B2 | 6/2016 | Lambert et al. |
| 9,398,455 B2 | 7/2016 | Lambert |
| 9,402,270 B2 | 7/2016 | Lambert |
| 9,521,635 B1 | 12/2016 | Lambert |
| 2002/0065834 A1 | 5/2002 | Wiggen et al. |
| 2002/0069354 A1 | 6/2002 | Fallon et al. |
| 2002/0087816 A1 | 7/2002 | Atkinson et al. |
| 2002/0103930 A1 | 8/2002 | Kamentsky et al. |
| 2003/0014368 A1 | 1/2003 | Leurig et al. |
| 2003/0188162 A1 | 10/2003 | Candelore et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0015621 A1 | 1/2004 | Tanaka |
| 2004/0030909 A1 | 2/2004 | Sako et al. |
| 2004/0054898 A1 | 3/2004 | Chao et al. |
| 2004/0103272 A1 | 5/2004 | Zimmer et al. |
| 2004/0125679 A1 | 7/2004 | Kwean |
| 2004/0158669 A1 | 8/2004 | Weng et al. |
| 2004/0158708 A1 | 8/2004 | Peyravian et al. |
| 2004/0184343 A1 | 9/2004 | Roohparvar et al. |
| 2004/0187001 A1 | 9/2004 | Bousis |
| 2004/0193875 A1 | 9/2004 | Aura |
| 2004/0257462 A1 | 12/2004 | Goris et al. |
| 2004/0264699 A1 | 12/2004 | Meandzija et al. |
| 2004/0266386 A1 | 12/2004 | Kuo |
| 2005/0015602 A1 | 1/2005 | Rees |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0088980 A1 | 4/2005 | Olkkonen et al. |
| 2005/0089005 A1 | 4/2005 | Sakoda et al. |
| 2005/0108171 A1 | 5/2005 | Bajikar et al. |
| 2005/0114686 A1 | 5/2005 | Ball et al. |
| 2005/0138365 A1 | 6/2005 | Bellipady et al. |
| 2005/0144468 A1 | 6/2005 | Northcutt et al. |
| 2005/0156925 A1 | 7/2005 | Fong et al. |
| 2005/0177674 A1 | 8/2005 | Ober et al. |
| 2005/0185596 A1 | 8/2005 | Kamentsky et al. |
| 2005/0210290 A1 | 9/2005 | Ono et al. |
| 2005/0278523 A1 | 12/2005 | Fortin et al. |
| 2006/0004946 A1 | 1/2006 | Shah et al. |
| 2006/0019653 A1* | 1/2006 | Stamoulis ............ H04W 48/18 455/425 |
| 2006/0036897 A1 | 2/2006 | Lin et al. |
| 2006/0059372 A1 | 3/2006 | Fayar et al. |
| 2006/0072748 A1 | 4/2006 | Buer |

(56) References Cited

U.S. PATENT DOCUMENTS

| | | |
|---|---|---|
| 2006/0075259 A1 | 4/2006 | Bajikar et al. |
| 2006/0090084 A1 | 4/2006 | Buer |
| 2006/0104243 A1 | 5/2006 | Park |
| 2006/0117177 A1 | 6/2006 | Buer |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2006/0200670 A1 | 9/2006 | Kuffel et al. |
| 2006/0209595 A1 | 9/2006 | Newell |
| 2006/0233149 A1 | 10/2006 | Rustagi et al. |
| 2006/0253704 A1 | 11/2006 | Kempf et al. |
| 2006/0253716 A1 | 11/2006 | Dhiman et al. |
| 2006/0259656 A1 | 11/2006 | Sullivan |
| 2006/0285686 A1 | 12/2006 | Van Den Heuvel et al. |
| 2007/0005824 A1 | 1/2007 | Howard |
| 2007/0011445 A1 | 1/2007 | Waltermann et al. |
| 2007/0022469 A1 | 1/2007 | Cooper et al. |
| 2007/0038866 A1 | 2/2007 | Bardsley et al. |
| 2007/0073915 A1 | 3/2007 | Go et al. |
| 2007/0097904 A1 | 5/2007 | Mukherjee et al. |
| 2007/0098178 A1 | 5/2007 | Raikar |
| 2007/0136792 A1 | 6/2007 | Ting et al. |
| 2007/0150756 A1 | 6/2007 | Kudelski |
| 2007/0174602 A1 | 7/2007 | Kao |
| 2007/0180271 A1 | 8/2007 | Hatakeyama et al. |
| 2007/0186105 A1 | 8/2007 | Bailey et al. |
| 2007/0189249 A1 | 8/2007 | Gurevich et al. |
| 2007/0220501 A1 | 9/2007 | Yanagawa et al. |
| 2007/0234028 A1 | 10/2007 | Rothman et al. |
| 2007/0242643 A1 | 10/2007 | Chandra et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0005549 A1 | 1/2008 | Ke |
| 2008/0016313 A1 | 1/2008 | Murotake et al. |
| 2008/0028243 A1 | 1/2008 | Morisawa |
| 2008/0034411 A1 | 2/2008 | Aoyama |
| 2008/0043508 A1 | 2/2008 | Chao et al. |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0082837 A1 | 4/2008 | Mattsson |
| 2008/0091944 A1 | 4/2008 | von Mueller et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0165952 A1 | 7/2008 | Smith et al. |
| 2008/0181154 A1* | 7/2008 | Sherman .............. H04W 48/16 370/311 |
| 2008/0295157 A1 | 11/2008 | Wong et al. |
| 2008/0298289 A1 | 12/2008 | Jeyaseelan |
| 2008/0313462 A1 | 12/2008 | Zhao et al. |
| 2009/0006658 A1 | 1/2009 | Gough |
| 2009/0019250 A1 | 1/2009 | Rofougaran et al. |
| 2009/0024846 A1 | 1/2009 | Ganesan et al. |
| 2009/0049222 A1 | 2/2009 | Lee et al. |
| 2009/0059841 A1 | 3/2009 | Laroia et al. |
| 2009/0077618 A1 | 3/2009 | Pearce et al. |
| 2009/0080389 A1 | 3/2009 | Messerges et al. |
| 2009/0131061 A1 | 5/2009 | Palanki et al. |
| 2009/0199031 A1 | 8/2009 | Zhang |
| 2009/0217043 A1 | 8/2009 | Metke et al. |
| 2009/0254771 A1 | 10/2009 | So et al. |
| 2009/0296866 A1 | 12/2009 | Hsieh |
| 2009/0323972 A1 | 12/2009 | Kohno et al. |
| 2009/0327608 A1 | 12/2009 | Eschmann et al. |
| 2010/0023747 A1 | 1/2010 | Asnaashari et al. |
| 2010/0039864 A1 | 2/2010 | Sarin et al. |
| 2010/0058045 A1 | 3/2010 | Borras et al. |
| 2010/0070751 A1 | 3/2010 | Chue |
| 2010/0174934 A1 | 7/2010 | Zhao |
| 2010/0217935 A1 | 8/2010 | Cho et al. |
| 2011/0039592 A1 | 2/2011 | Haddad et al. |
| 2011/0211564 A1 | 9/2011 | Yoneyama et al. |
| 2011/0231649 A1 | 9/2011 | Bollay et al. |
| 2011/0231652 A1 | 9/2011 | Bollay et al. |
| 2012/0284517 A1 | 11/2012 | Lambert |
| 2012/0287337 A1 | 11/2012 | Kumar et al. |
| 2013/0031346 A1 | 1/2013 | Sakarda |
| 2013/0046966 A1 | 2/2013 | Chu |
| 2013/0124844 A1 | 5/2013 | Baratam |
| 2013/0132502 A1 | 5/2013 | Stacey et al. |
| 2013/0143499 A1 | 6/2013 | Ando et al. |
| 2013/0148639 A1* | 6/2013 | Gao .................. H04J 3/0641 370/336 |
| 2013/0246792 A1 | 9/2013 | Lambert |
| 2013/0329620 A1* | 12/2013 | Kim .................. H04W 52/0229 370/311 |
| 2013/0346777 A1 | 12/2013 | Zhang |
| 2014/0045536 A1 | 2/2014 | Sydir et al. |
| 2014/0092877 A1 | 4/2014 | Kazmi et al. |
| 2014/0171109 A1 | 6/2014 | Segev |
| 2014/0200044 A1 | 7/2014 | Kimura et al. |
| 2014/0258724 A1 | 9/2014 | Lambert et al. |
| 2015/0006633 A1 | 1/2015 | Vandwalle et al. |
| 2015/0036540 A1 | 2/2015 | Kasslin et al. |
| 2015/0071438 A1 | 3/2015 | Lambert |
| 2015/0131571 A1 | 5/2015 | Fodor et al. |
| 2015/0200811 A1 | 7/2015 | Kasslin et al. |
| 2016/0209200 A1 | 7/2016 | Kanayama |

FOREIGN PATENT DOCUMENTS

| | | |
|---|---|---|
| CN | 101097522 | 1/2008 |
| CN | 102272734 | 9/2014 |
| EP | 1847911 | 10/2007 |
| EP | 2493230 | 8/2012 |
| EP | 2605170 | 6/2013 |
| GB | 2407239 | 4/2005 |
| JP | 08076872 | 3/1996 |
| JP | 09044418 | 2/1997 |
| JP | 10320302 | 12/1998 |
| JP | 2002099502 | 4/2002 |
| JP | 2002215409 | 8/2002 |
| JP | 2004005254 | 1/2004 |
| JP | 2005011120 | 1/2005 |
| JP | 5565778 | 6/2014 |
| WO | WO-2013019423 | 2/2013 |
| WO | WO-2013074797 | 5/2013 |

OTHER PUBLICATIONS

"Notice of Allowance", U.S. Appl. No. 14/281,693, Aug. 8, 2016, 7 pages.

"Advisory Action", U.S. Appl. No. 13/804,425, Dec. 26, 2014, 3 pages.

"Amendment 3: Enhancements for Very High Throughput in the 50 GHz Band", Sponsor IEEE 802.11 Committee of the IEEE Computer Society, IEEE P802.11ad/D5.0 (Draft Amendment Based on IEEE P802.11REVmb D10.0) (Amendment to IEEE 802.11REVmb D10.0 as amended by IEEE 802.11ae D5.0 and IEEE 802.11aa 06.0); Draft Standard for Information Technology Telecommunications and Information Exchange, Sep. 2011, 601 pages.

"Amendment 3: Enhancements for Very High Throughput in the 60 GHz Band", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Jul. 2012, 628 pages.

"Amendment 4: Enhancements for Very High Throughput for Operation in Bands below 6 GHz", IEEE Standard for Information technology; Telecommunications and information exchange between systems; Local and metropolitan area networks; Specific requirements; Part 11: Wireless LAN Medium Access Control (MAC) and Physical Layer (PHY) Specifications, Sep. 2011, 425 pages.

"Amendment 4: TV White Spaces Operation", The Institute of Electrical and Electronics Engineers, Inc., IEEE Std P802.11af/D1.05 Draft Standard for Information Technology—Telecommunica-

(56) References Cited

OTHER PUBLICATIONS tions and Information Exchange Between Systems—Local and Metropolitan area networks—Specific Requirements, Part 11: Wireless LAN Medium Access Control (MAC) and Physical Layer, Nov. 2011, 123 Pages.
"Amendment 6: Sub 1 GHz License Exempt Operation", 802.11 Working Group of the LAN/MAN Standards Committee of the IEEE Computer Society, IEEE P802.11ah/D1.0 Draft Standard for Information Technology—Telecommunications and Information exchange between systems Local and Metropolitan Area Networks—Specific Requirements Part 11: Wireless LAN Medium Access Control (MAC) and Physical Layer (PH, Oct. 2013, 394 Pages.
"Amendment 8: IEEE 802.11 Wireless Network Management", Prepared by the LAN/MAN Standards Committee of the IEEE Computer Society, Draft Standard for Information technology Telecommunications and information exchange between systems—Local and metropolitan area networks Specific requirements—Part 11: Wireless LAN Medium Access Control (MAC) and Physical Layer (PHY) specifications, Aug. 2010, 426 Pages.
"Board Opinion", CN Application No. 200980136849.9, Aug. 28, 2015, 18 Pages.
"Corrected Notice of Allowance", U.S. Appl. No. 13/676,701, May 18, 2016, 2 pages.
"Examiner's Answer to Appeal Brief", U.S. Appl. No. 13/958,101, Apr. 8, 2016, 9 pages.
"Extensions to Direct Link Setup (DLS) Comments", IEEE, P802.11z, Jul. 2009, pp. 1-3.
"Final Office Action", U.S. Appl. No. 12/098,254, May 18, 2011, 11 pages.
"Final Office Action", U.S. Appl. No. 12/101,668, May 10, 2012, 8 pages.
"Final Office Action", U.S. Appl. No. 12/125,670, May 24, 2011, 11 pages.
"Final Office Action", U.S. Appl. No. 12/125,693, Jun. 9, 2011, 9 pages.
"Final Office Action", U.S. Appl. No. 12/178,268, May 25, 2011, 13 pages.
"Final Office Action", U.S. Appl. No. 12/541,731, May 31, 2012, 11 pages.
"Final Office Action", U.S. Appl. No. 13/552,421, Mar. 16, 2015, 10 pages.
"Final Office Action", U.S. Appl. No. 13/804,425, Nov. 6, 2015, 9 pages.
"Final Office Action", U.S. Appl. No. 13/804,425, Nov. 21, 2014, 17 pages.
"Final Office Action", U.S. Appl. No. 13/863,079, Jan. 15, 2015, 7 pages.
"Final Office Action", U.S. Appl. No. 13/863,079, May 7, 2014, 7 pages.
"Final Office Action", U.S. Appl. No. 13/958,101, Dec. 19, 2014, 17 pages.
"Foreign Office Action", CN Application No. 200980136849.9, May 24, 2013, 20 Pages.
"Foreign Decision to Grant", JP Application No. 2011-544456, May 20, 2014, 2 pages.
"Foreign Notice of Allowance", CN Application No. 200980153758.6, Jul. 15, 2014, 4 Pages.
"Foreign Notice of Allowance", JP Application No. 2011-527899, Jan. 28, 2014, 1 Page.
"Foreign Office Action", CN Application No. 201280033662.8, May 3, 2016, 13 pages.
"Foreign Office Action", CN Application No. 200980136849.9, Feb. 7, 2014, 15 Pages.
"Foreign Office Action", CN Application No. 200980136849.9, May 19, 2014, 11 Pages.
"Foreign Office Action", CN Application No. 200980153758.6, Apr. 27, 2013, 14 pages.
"Foreign Office Action", CN Application No. 200980153758.6, Dec. 30, 2013, 8 pages.
"Foreign Office Action", European Patent Application No. 09803951.4, May 24, 2012, 3 pages.
"Foreign Office Action", European Patent Application No. 09803951.4, Dec. 13, 2012, 6 pages.
"Foreign Office Action", JP Application No. 2011-527899, Apr. 16, 2013, 5 pages.
"Foreign Office Action", JP Application No. 2011-527899, Nov. 6, 2012, 4 pages.
"Foreign Office Action", JP Application No. 2011-527899, Aug. 13, 2013, 2 pages.
"Foreign Office Action", JP Application No. 2011-544456, Jan. 29, 2013, 7 pages.
"Foreign Office Action", JP Application No. 2011-544456, Dec. 3, 2013, 2 pages.
"Foreign Office Action", JP Application No. 2011-544456, Jul. 9, 2013, 6 pages.
"Foreign Office Action", KR Application No. 10-2011-7008700, Jun. 16, 2015, 13 Pages.
"IEEE Standard for Information Technology—Telecommunications and Information Exchange between Systems—Local and Metropolitan Area Networks—Specific Requirements", IEEE Std. 802.11-2007, Jun. 12, 2007, 1232 pages.
"Information Technology—Telecommunications and Information Exchange Between Systems—Local and Metropolitan Area Networks—Specific Requirements", IEEE, Wireless LAN Medium Access Control (MAC) and Physical Layer (PHY) Specifications, Aug. 20, 1999, 531 pages.
"Intent to Grant", EP Application No. 09803951.4, May 14, 2013, 13 Pages.
"International Search Report and Written Opinion", Application No. PCT/US2009/067767, Mar. 26, 2010, 12 pages.
"International Search Report and Written Opinion", Application No. PCT/US2009/056973, Nov. 4, 2009, 13 pages.
"International Search Report and Written Opinion", Application No. PCT/US2012/047426, Oct. 19, 2012, 7 pages.
"International Search Report and Written Opinion", Application No. PCT/US2012/065290, May 2, 2013, 9 pages.
"International Search Report and Written Opinion", PCT Application No. PCT/US2013/031545, Mar. 14, 2015, 11 pages.
"International Search Report and Written Opinion", PCT Application No. PCT/US2014/0211295, Nov. 24, 2014, 16 pages.
"International Search Report and Written Opinion", PCT Application No. PCT/US2014/054885, Dec. 4, 2014, 8 pages.
"International Search Report and Written Opinion", PCT Application PCT/US2012/036236, Jul. 6, 2012, 9 pages.
"International Search Report", Application No. PCT/US2008/078343, May 18, 2009, 5 pages.
"International Search Report", Application No. PCT/US2008/078343, Partial International Search, Mar. 5, 2009, 2 pages.
"Invitation to Pay Additional Fees and Partial International Search Report", PCT Application No. PCT/US2014/021295, Aug. 13, 2014, 5 pages.
"Marketing Requirements Document for Interoperability Testing & Certification of Device Provisioning Protocol", Wi-Fi Alliance Device Provisioning Protocol Marketing Task Group; Version 1.2, 2012, 34 pages.
"Non-Final Office Action", U.S. Appl. No. 12/098,254, Jan. 14, 2011, 8 pages.
"Non-Final Office Action", U.S. Appl. No. 12/101,668, Apr. 5, 2011, 7 pages.
"Non-Final Office Action", U.S. Appl. No. 12/101,668, Aug. 9, 2012, 8 pages.
"Non-Final Office Action", U.S. Appl. No. 12/125,670, Dec. 13, 2011, 11 pages.
"Non-Final Office Action", U.S. Appl. No. 12/125,670, Dec. 7, 2010, 9 pages.
"Non-Final Office Action", U.S. Appl. No. 12/125,670, Jun. 4, 2012, 12 pages.
"Non-Final Office Action", U.S. Appl. No. 12/125,693, Oct. 3, 2011, 7 pages.
"Non-Final Office Action", U.S. Appl. No. 12/125,693, Dec. 20, 2010, 7 pages.

(56) References Cited

OTHER PUBLICATIONS

"Non-Final Office Action", U.S. Appl. No. 12/178,268, Dec. 21, 2011, 13 pages.
"Non-Final Office Action", U.S. Appl. No. 12/178,268, Dec. 22, 2010, 10 pages.
"Non-Final Office Action", U.S. Appl. No. 12/271,761, Oct. 3, 2011, 6 pages.
"Non-Final Office Action", U.S. Appl. No. 12/541,731, Oct. 21, 2011, 9 pages.
"Non-Final Office Action", U.S. Appl. No. 12/541,731, Sep. 4, 2012, 11 pages.
"Non-Final Office Action", U.S. Appl. No. 12/559,987, Nov. 9, 2011, 10 pages.
"Non-Final Office Action", U.S. Appl. No. 12/636,558, Jan. 10, 2012, 6 pages.
"Non-Final Office Action", U.S. Appl. No. 12/636,558, May 29, 2012, 8 pages.
"Non-Final Office Action", U.S. Appl. No. 13/252,416, Mar. 13, 2013, 16 pages.
"Non-Final Office Action", U.S. Appl. No. 13/333,551, Apr. 6, 2012, 5 pages.
"Non-Final Office Action", U.S. Appl. No. 13/462,972, May 22, 2013, 10 pages.
"Non-Final Office Action", U.S. Appl. No. 13/552,421, Sep. 30, 2014, 23 pages.
"Non-Final Office Action", U.S. Appl. No. 13/598,282, Oct. 16, 2013, 6 pages.
"Non-Final Office Action", U.S. Appl. No. 13/657,511, Mar. 28, 2013, 13 pages.
"Non-Final Office Action", U.S. Appl. No. 13/676,701, Jul. 31, 2015, 12 pages.
"Non-Final Office Action", U.S. Appl. No. 13/683,056, Nov. 8, 2013, 5 pages.
"Non-Final Office Action", U.S. Appl. No. 13/804,425, May 4, 2015, 15 pages.
"Non-Final Office Action", U.S. Appl. No. 13/804,425, Jul. 18, 2014, 14 pages.
"Non-Final Office Action", U.S. Appl. No. 13/863,079, Apr. 9, 2015, 7 pages.
"Non-Final Office Action", U.S. Appl. No. 13/863,079, Jun. 20, 2013, 10 pages.
"Non-Final Office Action", U.S. Appl. No. 13/863,079, Aug. 27, 2014, 6 pages.
"Non-Final Office Action", U.S. Appl. No. 13/863,079, Oct. 1, 2013, 9 pages.
"Non-Final Office Action", U.S. Appl. No. 13/874,201, Jun. 5, 2015, 10 pages.
"Non-Final Office Action", U.S. Appl. No. 13/958,101, Apr. 8, 2015, 16 pages.
"Non-Final Office Action", U.S. Appl. No. 13/958,101, Jun. 6, 2014, 14 pages.
"Non-Final Office Action", U.S. Appl. No. 14/198,994, Jul. 31, 2015, 12 pages.
"Non-Final Office Action", U.S. Appl. No. 14/205,196, Feb. 5, 2016, 14 pages.
"Non-Final Office Action", U.S. Appl. No. 14/482,072, Nov. 19, 2015, 5 pages.
"Notice of Allowance", U.S. Appl. No. 12/098,254, Dec. 14, 2011, 4 pages.
"Notice of Allowance", U.S. Appl. No. 12/098,254, Sep. 28, 2011, 4 pages.
"Notice of Allowance", U.S. Appl. No. 12/101,668, Jan. 11, 2013, 6 pages.
"Notice of Allowance", U.S. Appl. No. 12/125,670, Dec. 11, 2012, 8 pages.
"Notice of Allowance", U.S. Appl. No. 12/178,268, Jul. 2, 2012, 4 pages.
"Notice of Allowance", U.S. Appl. No. 12/271,761, Jan. 3, 2012, 6 pages.
"Notice of Allowance", U.S. Appl. No. 12/541,731, Apr. 2, 2013, 8 pages.
"Notice of Allowance", U.S. Appl. No. 12/559,987, Jun. 15, 2012, 5 pages.
"Notice of Allowance", U.S. Appl. No. 12/636,558, Jan. 9, 2013, 4 pages.
"Notice of Allowance", U.S. Appl. No. 13/252,416, Sep. 27, 2013, 10 pages.
"Notice of Allowance", U.S. Appl. No. 13/333,551, May 30, 2012, 4 pages.
"Notice of Allowance", U.S. Appl. No. 13/552,421, May 12, 2015, 4 pages.
"Notice of Allowance", U.S. Appl. No. 13/552,421, Jun. 10, 2015, 5 pages.
"Notice of Allowance", U.S. Appl. No. 13/598,282, May 6, 2014, 4 pages.
"Notice of Allowance", U.S. Appl. No. 13/657,511, Nov. 4, 2013, 9 pages.
"Notice of Allowance", U.S. Appl. No. 13/676,701, Feb. 10, 2016, 5 pages.
"Notice of Allowance", U.S. Appl. No. 13/683,056, May 9, 2014, 4 pages.
"Notice of Allowance", U.S. Appl. No. 13/804,425, Mar. 21, 2016, 9 pages.
"Notice of Allowance", U.S. Appl. No. 13/874,201, Sep. 25, 2015, 6 pages.
"Notice of Allowance", U.S. Appl. No. 14/198,994, Jan. 29, 2016, 10 pages.
"Notice of Allowance", U.S. Appl. No. 14/482,072, Mar. 22, 2016, 5 pages.
"Notification Concerning Transmittal of International Preliminary Report on Patentability", PCT Application No. PCT/US2014/021295, Sep. 17, 2015, 12 pages.
"Part 11—Wireless LAN Medium Access Control (MAC) and Physical Layer (PHY) Specifications", Information Technology—Telecommunications & Information Exchange Between Systems . . . International Standard, ISO/IEC 8802-11, First Ed., 1999, pp. 1-531.
"Part 16: Air Interface for Broadband Wireless Access Systems", IEEE Standard for Local and Metropolitan Area Networks, May 29, 2009, 2082 pages.
"Public Key Cryptography for the Financial Services Industry: Elliptic Curve Key Agreement and Key Transport Schemes", Working Draft; Version 2.0, Jul. 5, 1998, 125 pages.
"Restriction Requirement", U.S. Appl. No. 12/101,668, Sep. 22, 2011, 6 pages.
"Restriction Requirement", U.S. Appl. No. 13/676,701, Feb. 12, 2015, 7 pages.
"Specification of the Bluetooth System, Version 2.0: vol. 0", Master Table of Contents & Compliance Requirements; pp. 1-74; vol. 1, "Architecture & Terminology Overview", pp. 1-92; vol. 2, "Core System Package [Controller Volume]", pp. 1-814; vol. 4, "Core System Package [Host Volume]"; pp. 1-250, Nov. 4, 2004, 1230 pages.
"Specification Requirements Document (SRD) for Devise Provisioning Protocol", Wi-Fi Alliance Device Provisioning Protocol Marketing Task Group; Version 1.1, 2013, 13 pages.
"Supplemental Notice of Allowance", U.S. Appl. No. 12/101,668, Feb. 8, 2013, 4 Pages.
"Supplemental Notice of Allowance", U.S. Appl. No. 13/333,551, Oct. 23, 2012, 2 pages.
"Wi-Fi Peer-to-Peer (P2P) Technical Specification", Wi-Fi Alliance Technical Committee P2P Task Group; Draft Version 1.14, Jun. 25, 2010, 154 pages.
"Wi-Fi Peer-to-Peer (P2P) Technical Specification", WiFi Alliance; Version 1.5, 2014, 183 pages.
Anderson, "HDD Based Full Disc Encryption", In Proceedings of THIC Conference 2006, Mar. 2006, 12 pages.
Chen, "Home Network Basis: Transmission Environments and Wired/Wireless Protocols", Prentice Hall, Jul. 2003, 19 pages.
Cooper, "Internet X.509 Public Key Infrastructure Certificate and Certificate Revocation List (SRL) Profile", Network Working Group; RFC 5280, May 2008, 152 pages.

(56) References Cited

OTHER PUBLICATIONS

Harada, "Project: IEEE P802.15 Working Group for Wireless Personal Area Network (WPANs)", IEEE 802.15-07-0693-003c; Slides 24-33 as provided in U.S. Appl. No. 14/198,994 in an IDS submission filed Feb. 24, 2015, May 2007, 10 pages.
Harkins, "Synthetic Initialization Vecor (SIV) Authenticated Encryption Using the Advanced Encryption Standard (AES)", Network Working Group; RFC 5297; Aruba Networks, Oct. 2008, 27 pages.
Hiertz, "The IEEE 802.11 Universe", IEEE Standards in Communications and Networking; IEEE Communications Magazine, Jan. 2010, 9 pages.
Krawczyk, "HMAC-based Extract-and-Expand Key Derivation Function (HKDF)", Internet Engineering Task Forct (IETF); RFC 5869, May 2010, 15 pages.
McGrew, "Fundamental Elliptic Curve Cryptography Algorithms", Internet Engineering Task Force (IETF); RFC 6090; Fundamental Elliptic Cryptography Algorithms, Feb. 2011, 35 pages.
Perahia, "Gigabit Wireless LANs: an overview of IEEE 802.11ac and 802.11ad", ACM SIGMOBILE Mobile Computing and Communications Review; vol. 15, No. 3, 11 pages, pp. 23-33.
Robinson, "Wi-Fi Simple Configuration Protocol and Usability Best Practices for the Wi-Fi Protected Setup Program", Wi-Fi Alliance; Version 2.0.1, Apr. 2011, 30 pages.
Van Beijnum "Crypto Based Host Identifiers", Internet Draft; draft-van-beijnum-multi6-cbhi-00.txt; ISSN: 0000-0004; XP15036389A, Jan. 1, 2004, 9 pages.
"Non-Final Office Action", U.S. Appl. No. 14/281,693, Feb. 18, 2016, 4 pages.
"Non-Final Office Action", U.S. Appl. No. 14/693,744, Dec. 16, 2016, 24 pages.

\* cited by examiner

METHODS AND APPARATUS FOR SYNCHRONIZING DEVICES IN A WIRELESS DATA COMMUNICATION SYSTEM

CROSS-REFERENCE TO RELATED APPLICATION

This present disclosure claims priority to U.S. Provisional Patent Application Ser. No. 61/825,318 filed May 20, 2013, the disclosure of which is incorporated herein by reference in its entirety.

BACKGROUND

As the number and types of computing and other electronic devices that are available has increased, it has become increasingly important for devices to be able to communicate with one another. This communication oftentimes involves sending (or transmitting) data from one device to another via a wireless network. Although wireless networks allow data to be communicated among various devices, wireless networks are not without their problems. One such problem is that each device can have its own clock that operates slightly faster or slower than the clocks of other devices in the network. These differences in clock speed can make it difficult for devices to know when they are supposed to send data on the network and when they are supposed to listen for data sent by other devices.

SUMMARY

This summary is provided to introduce subject matter that is further described below in the Detailed Description and Drawings. Accordingly, this Summary should not be considered to describe essential features nor used to limit the scope of the claimed subject matter.

In general, in one aspect, this specification describes a method implemented in a first wireless transceiver device of a wireless data communication system. The method includes receiving, from a second wireless transceiver device of the wireless data communication system, a first beacon that identifies (i) when the first wireless transceiver device is to listen for data and (ii) when the first wireless transceiver device is to send data, wherein the first beacon further includes a timestamp. The method also includes obtaining, from the first beacon, a time quality of a time source of the second wireless transceiver device, wherein the time quality of the time source of the second wireless transceiver device indicates how accurately the time source of the second wireless transceiver device reflects real time, and determining a time quality of a time source of the first wireless transceiver device, wherein the time quality of the time source of the first wireless transceiver device indicates how accurately the time source of the first wireless transceiver device reflects real time. The method further includes adjusting, based on the timestamp in the first beacon, a clock of the first wireless transceiver device in response to the time source of the second wireless transceiver device reflecting real time more accurately than the time source of the first wireless transceiver device, and leaving the clock of the first wireless transceiver device unadjusted in response to the time source of the first wireless transceiver device reflecting real time more accurately than the time source of the second wireless transceiver device.

In general, in another aspect, this specification describes a first wireless transceiver device of a wireless data communication system, the first wireless transceiver device including a transceiver and a beacon based clock system. The transceiver is configured to receive, from a second wireless transceiver device of the wireless data communication system, a first beacon that identifies (i) when the first wireless transceiver device is to listen for data and (ii) when the first wireless transceiver device is to send data, wherein the first beacon further includes a timestamp. The beacon based clock system is configured to obtain, from the first beacon, a time quality of a time source of the second wireless transceiver device, wherein the time quality of the time source of the second wireless transceiver device indicates how accurately the time source of the second wireless transceiver device reflects real time, and determine a time quality of a time source of the first wireless transceiver device, wherein the time quality of the time source of the first wireless transceiver device indicates how accurately the time source of the first wireless transceiver device reflects real time. The beacon based clock system is further configured to adjust, based on the timestamp in the first beacon, a clock of the first wireless transceiver device in response to the time source of the second wireless transceiver device reflecting real time more accurately than the time source of the first wireless transceiver device, and leave the clock of the first wireless transceiver device unadjusted in response to the time source of the first wireless transceiver device reflecting real time more accurately than the time source of the second wireless transceiver device.

In general, in another aspect, this specification describes a computer-readable memory device comprising computer-executable instructions that, when executed, implement a system in a first wireless transceiver device of a wireless data communication system to receive, from a second wireless transceiver device of the wireless data communication system, a first beacon that identifies (i) when the first wireless transceiver device is to listen for data and (ii) when the first wireless transceiver device is to send data, wherein the first beacon further includes a timestamp. The system is also to obtain, from the first beacon, a time quality of a time source of the second wireless transceiver device, wherein the time quality of the time source of the second wireless transceiver device indicates how accurately the time source of the second wireless transceiver device reflects real time, and determine a time quality of a time source of the first wireless transceiver device, wherein the time quality of the time source of the first wireless transceiver device indicates how accurately the time source of the first wireless transceiver device reflects real time. The system is further to adjust, based on the timestamp in the first beacon, a clock of the first wireless transceiver device in response to the time source of the second wireless transceiver device reflecting real time more accurately than the time source of the first wireless transceiver device, and leave the clock of the first wireless transceiver device unadjusted in response to the time source of the first wireless transceiver device reflecting real time more accurately than the time source of the second wireless transceiver device.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Methods and apparatus for synchronizing devices in a wireless data communication system are discussed herein. A wireless data communication system includes multiple wireless transceiver devices each capable of operating as both a transmitter device and a receiver device. One or more of the wireless transceiver devices transmits a beacon at various intervals that includes both a timestamp indicating a current time and date of the transmitting wireless transceiver device, and a time quality indication indicating a quality of the time source of the transmitting wireless transceiver device. In one or more embodiments, the quality of a time source of a particular wireless transceiver device refers to how accurately an internal clock of the wireless transceiver device reflects real time.

Other wireless transceiver devices in the wireless data communication system receive the beacon, and each wireless transceiver device receiving the beacon evaluates the time quality indication included in the beacon relative to the quality of the time source of the receiving wireless transceiver device. If the time quality indication included in the beacon indicates the transmitting wireless transceiver device has a higher quality time source than the receiving wireless transceiver device, then the receiving wireless transceiver device adjusts its clock based on the timestamp in the beacon. However, if the time quality indication included in the beacon indicates the transmitting wireless transceiver device does not have a higher quality time source than the receiving wireless transceiver device, then the receiving wireless transceiver device need not adjust its clock based on the timestamp in the beacon.

Figure 1:
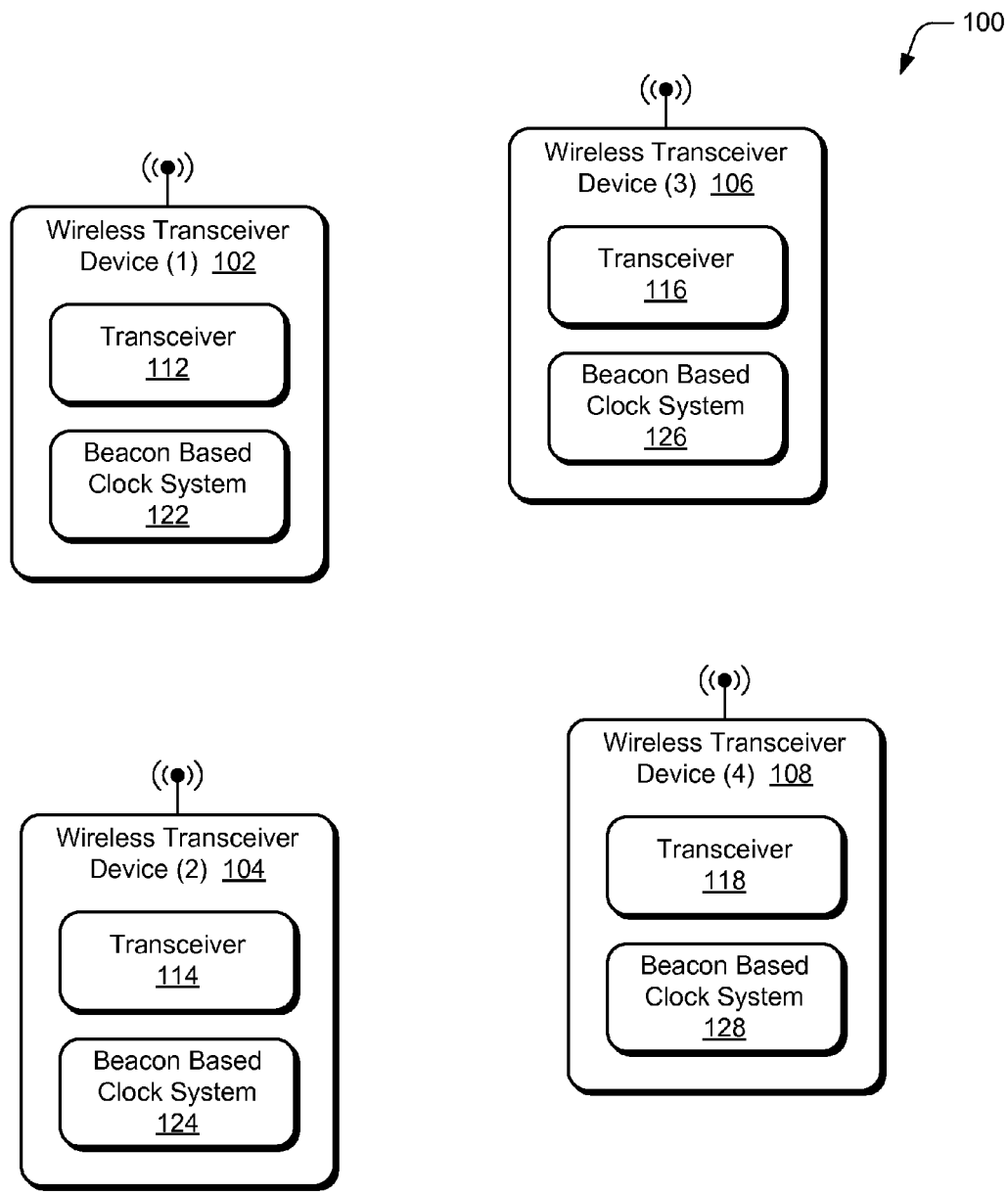
FIG. 1 illustrates an example wireless data communication system in which the methods and apparatus for synchronizing devices in a wireless data communication system can be used in accordance with one or more embodiments.

FIG. 1 illustrates an example wireless data communication system 100 in which the methods and apparatus for synchronizing devices in a wireless data communication system can be used in accordance with one or more embodiments. The wireless data communication system 100 includes a wireless transceiver device 102, a wireless transceiver device 104, a wireless transceiver device 106, and a wireless transceiver device 108. The wireless transceiver device 102 includes a transceiver 112 that transmits data that can be received by other devices in the wireless data communication system 100, and also receives data transmitted by other devices in the wireless data communication system 100. The wireless transceiver device 104 includes a transceiver 114 that transmits data that can be received by other devices in the wireless data communication system 100, and also receives data transmitted by other devices in the wireless data communication system 100. The wireless transceiver device 106 includes a transceiver 116 that transmits data that can be received by other devices in the wireless data communication system 100, and also receives data transmitted by other devices in the wireless data communication system 100. The wireless transceiver device 108 includes a transceiver 118 that transmits data that can be received by other devices in the wireless data communication system 100, and also receives data transmitted by other devices in the wireless data communication system 100.

One or more of the transceivers 112, 114, 116, and 118 also transmit beacons for the wireless data communication system 100, which are used by other devices in the wireless data communication system 100 to determine when to listen for data and when to send data as discussed in more detail below.

The wireless transceiver device 102 includes a beacon based clock system 122 that is updated based at least in part on beacons received by the wireless transceiver device 102. The wireless transceiver device 104 includes a beacon based clock system 124 that is updated based at least in part on beacons received by the wireless transceiver device 104. The wireless transceiver device 106 includes a beacon based clock system 126 that is updated based at least in part on beacons received by the wireless transceiver device 106. The wireless transceiver device 108 includes a beacon based clock system 128 that is updated based at least in part on beacons received by the wireless transceiver device 108.

The devices in the wireless data communication system 100 use a communication protocol that is asynchronous, and thus the wireless data communication system 100 is also referred to as being an asynchronous system. The devices in a wireless data communication system employing a synchronous communication protocol having common knowledge of the exact time at any given moment, and the devices can use this knowledge to know when to transmit or receive data. In contrast, the devices in an asynchronous system do not have common knowledge of the exact time at any given moment, and thus rely on the beacon to determine when to transmit or receive data. The beacons can thus be viewed as the mechanism for synchronizing devices in an asynchronous system, so each device knows when to transmit or receive data.

Furthermore, the wireless data communication system 100 is a distributed synchronization wireless data communication system, which refers to beacons used to synchronize the devices in the wireless data communication system being transmitted by various different ones of wireless transceiver devices 102, 104, 106, and 108. Absent from the wireless data communication system 100 is a single synchronous time source or point. Multiple different ones of wireless transceiver devices 102, 104, 106, and 108 can transmit beacons, and no single one of the wireless transceiver devices 102, 104, 106, or 108 is responsible for being a single synchronous time source or point.

In one or more embodiments, the wireless data communication system 100 uses a communication protocol that is compliant with Wi-Fi networks, such as networks implementing the IEEE 802.11 standard (e.g., as discussed in the IEEE Std 802.11-2012, Mar. 29, 2012). The wireless data communication system 100 operates in one of various modes of operation that are compliant with the IEEE 802.11 standard, such as BSS (Basic Service Set), IBSS (Independent Basic Service Set), NAN (Neighbor Awareness Networking), and so forth. Although reference is made herein to the IEEE 802.11 standard, it should be noted that the techniques discussed herein are also usable with other standards and signaling technologies that are generally asynchronous and not based on a single synchronous time source or point.

The beacon transmitted by one or more of the wireless transceiver devices 102, 104, 106, and 108 is a frame used for synchronizing the devices in the wireless data communication system 100. The beacon identifies when devices in the wireless data communication system 100 are to listen for (receive) data and when the devices in the wireless data communication system 100 are to send data. For example, each device in the wireless data communication system 100 can know that the device is to receive data during one particular range of microseconds after receipt of a beacon, and that the device can send data during another particular range of microseconds after the beacon.

Which of the wireless transceiver devices 102, 104, 106, and 108 transmits a beacon at any given time can be determined using any of a variety of public or proprietary techniques. For example, a beacon can be transmitted by the first of the wireless transceiver devices 102, 104, 106, and 108 that identifies a beacon window (e.g., a time range during which the wireless transceiver device is expecting to receive or transmit a beacon) and since the beginning of the beacon window has not received a beacon from another of the wireless transceiver devices 102, 104, 106, and 108.

It should be noted that although the wireless data communication system 100 is discussed as including multiple wireless transceiver devices, the wireless data communication system 100 can alternatively include one or more transmitter devices that transmit data that can be received by other devices in the wireless data communication system 100 but that do not receive data transmitted by other devices in the wireless data communication system 100. The wireless data communication system 100 can also alternatively include one or more receiver devices that receive data transmitted by other devices in the wireless data communication system 100 but that do not transmit data that can be received by other devices in the wireless data communication system 100.

Figure 2:
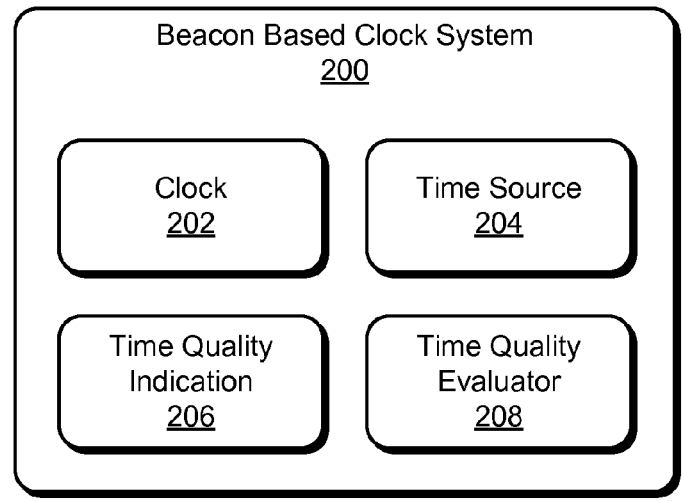
FIG. 2 illustrates an example beacon based clock system in accordance with one or more embodiments.

FIG. 2 illustrates an example beacon based clock system 200 in accordance with one or more embodiments. The beacon based clock system 200 is a beacon based clock system of a wireless transceiver device in a wireless data communication system. The beacon based clock system 200 can be any one of beacon based clock systems 122, 124, 126, or 128 of FIG. 1. The beacon based clock system 200 includes a clock 202, a time source 204, a time quality indication 206, and a time quality evaluator 208.

The clock 202 is an internal clock of the wireless transceiver device that implements the beacon based clock system 200 and maintains a current date and time for the beacon based clock system 200. The current date and time can be updated automatically using any of a variety of public and/or proprietary techniques, such as using a timer chip or other time sources.

The time source 204 is a source of the current date and time, and is used to update the clock 202. The time source can be the timer chip, or can be any of a variety of other hardware or software mechanisms, and the beacon based clock system 200 can include any number of time sources 204. The timer chip or other mechanism used to automatically update the clock 202 can drift over time, and this drift can be corrected by updating the clock 202 to reflect the current time and date provided by one or more additional time sources 204. Such additional time sources can be take various forms, such as components (hardware or software) receiving signals from devices or services external to the wireless transceiver device that includes the clock 202, such as signals from a GPS (Global Positioning System), signals from a cellular phone system, or other signal source.

The time quality indication 206 is an indication of the quality (e.g., accuracy) of the time source used to update the clock 202, the quality of the time source referring to how accurately the time source reflects (e.g., identifies) the actual or real time. Different time sources are associated with particular quality levels indicating the accuracy of the time and date provided by such time sources. Higher quality levels indicate more accurate time and date (time and date that is closer to or that more accurately reflects the actual or real time) than lower quality levels. The quality levels can be represented in any of a variety of different manners, such as numerically, alphabetically, other ordered list, and so forth. These quality levels are also referred to as a time quality of the clock 202 or of the wireless transceiver device that includes the beacon based clock system 200.

The quality levels of the time sources can also vary based on other state or characteristics of the wireless transceiver device implementing the beacon based clock system 200. For example, the quality levels of the time sources can vary based on how long the wireless transceiver device has been in a low power mode such as a sleep mode (e.g., the quality level being decreased more the longer the wireless transceiver device is in the low power mode). By way of another example, the quality levels of the time sources can vary based on whether the wireless transceiver device is operating on battery power or AC (e.g., plugged-in) power (e.g., the quality level being lower when operating on battery power than when operating on AC power).

For example, a beacon based clock system 200 having a time source that is a timer chip in a battery powered wireless transceiver device that has been asleep (in a sleep mode) for at least a threshold amount of time can be associated with a lower quality level (e.g., a quality level value of 0) than a beacon based clock system 200 having a time source that is a timer chip in a battery powered wireless transceiver device that has been in a higher power mode (not asleep) for at least the threshold amount of time (e.g., which may be associated with a quality level value of 1). By way of another example, a beacon based clock system 200 having a time source that is a timer chip in a battery powered wireless transceiver device can be associated with a lower quality level (e.g., a quality level value of 1) than a beacon based clock system 200 having a time source that is a timer chip in a plugged-in (e.g., AC) powered wireless transceiver device (e.g., which may be associated with a quality level value of 2). By way of yet another example, a beacon based clock system 200 having a time source that is a timer chip in a plugged-in (e.g., AC) powered wireless transceiver device can be associated with a lower quality level (e.g., a quality level value of 2) than a beacon based clock system 200 having a time source that is a GPS signal (e.g., which may be associated with a quality level value of 3).

It should be noted that the time source of the beacon based clock system 200 can change over time, and thus the time quality indication 206 can change over time. In one or more embodiments, the time quality indication 206 at a particular time is a highest quality level associated with a time source being used by the beacon based clock system 200 at that particular time. For example, assume the beacon based clock system 200 is included in a wireless transceiver device that is not plugged in to AC power and that includes GPS functionality. The time source of the wireless transceiver device including the beacon based clock system 200 is a GPS signal while the GPS functionality is activated (e.g., powered on) and is receiving signals from at least a threshold number of satellites. However, the time source of the wireless transceiver device including the beacon based clock system 200 is a timer chip in a battery powered wireless transceiver device while the GPS functionality is not activated or is not receiving signals from at least a threshold number of satellites.

Figure 3:
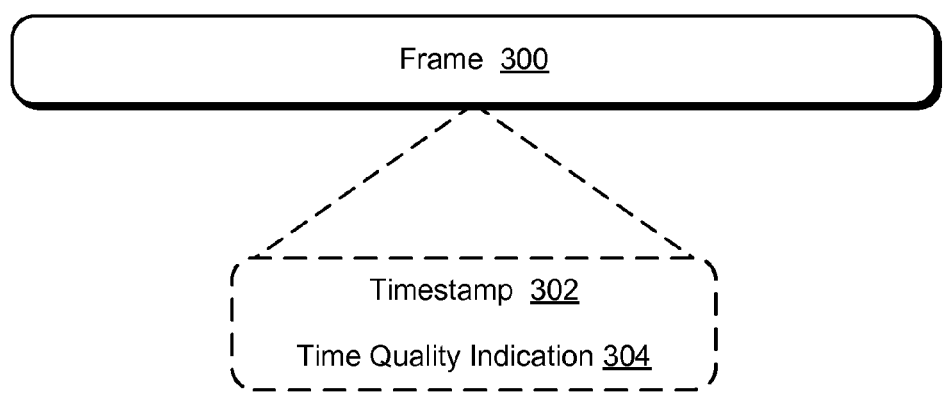
FIG. 3 illustrates an example frame of a beacon in accordance with one or more embodiments.

When a wireless transceiver device sends a beacon, the beacon is a frame of various data. FIG. 3 illustrates an example frame 300 of a beacon in accordance with one or more embodiments. The frame 300 includes a timestamp 302 and a time quality indication 304. The frame can optionally include various additional data or information based on the communication protocol used by the wireless data communication system. The timestamp 302 is an indication of the current time and date of the clock 202 of the beacon based clock system 200 of the wireless transceiver device transmitting the beacon. The timestamp 302 can take various forms, such as an encoding of the current time and date of the clock 202, an offset (indicated by the current time and date of the clock 202) from some time or date known by the devices in the wireless data communication system, and so forth.

The time quality indication 304 is an indication of the time quality indication 206 of the beacon based clock system 200 of the wireless transceiver device transmitting the beacon. The time quality indication 304 can take various forms, such as the same form as the time quality indication 206, an encoding of the time quality indication 206, and so forth. The time quality indication 206 can be a separate field in the frame 300, or can be inherent in other data in the frame 300. For example, the frame 300 can include a field identifying a type of wireless transceiver device implementing the beacon based clock system 200, and the time quality indication can be inherent in the type of wireless transceiver device implementing the beacon based clock system 200.

In one or more embodiments, the timestamp 302 is used as the TSF (Timing Synchronization Function) value in a beacon, such as a beacon compliant with the IEEE 802.11 standard. However, it should be noted that the timestamp 302 differs from traditional TSF values in that traditional TSF value are simply monotonically increasing counters, whereas the timestamp 302 is an indication of the current time and date of the clock 202.

Returning to FIG. 2, in response to a beacon received from another wireless transceiver device, the time quality evaluator 208 evaluates the time quality indication 304 in the received beacon. In response to the time quality indication 304 in the received beacon not being a higher quality level (e.g., being a lower quality level or the same quality level) than the time quality indication 206, no adjustment is made to the clock 202 based on the timestamp 302. However, in response to the time quality indication 304 in the received beacon being a higher quality level than the time quality indication 206, the clock 202 is adjusted based on the timestamp 302. The clock 202 can be adjusted based on the timestamp 302 in various manners. For example, the current date and time of the clock 202 can be updated to be the same as (or within a particular threshold amount of) the date and time indicated by the timestamp 302. By way of another example, the current date and time of the clock can be changed to be closer to the date and time indicated by the timestamp 302 (e.g., update the current date and time of the clock 202 to be half-way between the current date and time of the clock 202 and the date and time indicated by the timestamp 302).

Thus, each time a wireless transceiver device transmits a beacon, that beacon includes a timestamp indicating the current date and time of the clock of the transmitting wireless transceiver device. Each other wireless transceiver device that receives the beacon compares the time quality indication in the beacon to the time quality indication of its own time source. If the time quality indication in the beacon is a higher quality level (indicating that the transmitting wireless transceiver device has a higher quality time source than the receiving wireless transceiver device), then the receiving wireless transceiver device adjusts its clock based on the received timestamp. However, if the time quality indication in the beacon is not a higher quality level (indicating that the transmitting wireless transceiver device does not have a higher quality time source than the receiving wireless transceiver device), then the receiving wireless transceiver device does not adjust its clock based on the received timestamp.

Figure 4:
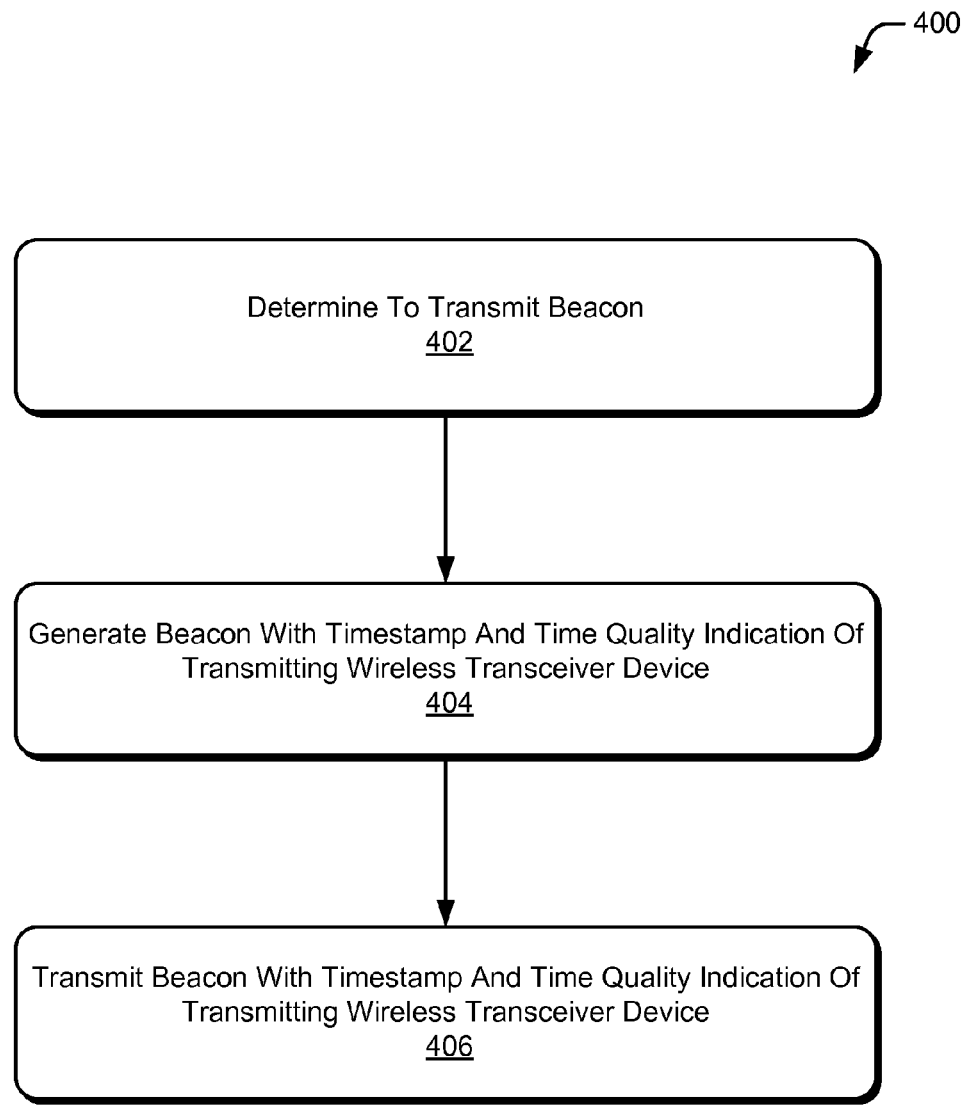
FIG. 4 is a flowchart illustrating an example process for transmitting a beacon in accordance with one or more embodiments.

FIG. 4 is a flowchart illustrating an example process 400 for transmitting a beacon in accordance with one or more embodiments. Process 400 is described in the form of a set of blocks that specify operations to be performed, however the operations are not necessarily limited to the order shown. The operations performed by the set of blocks in process 400 are performed by a wireless transceiver device, such as a wireless transceiver device 102, 104, 106, or 108 of FIG. 1. The wireless transceiver device implementing process 400 is also referred to as the transmitting wireless transceiver device.

At block 402, a determination is made by the transmitting wireless transceiver device to transmit a beacon. The determination can be made based on various different criteria, such as whether another wireless transceiver device has already transmitted a beacon in a current beacon window, an amount of time since the transmitting wireless transceiver device last transmitted a beacon, and so forth.

At block 404, a beacon is generated. The beacon includes a timestamp of the transmitting wireless transceiver device indicating the current date and time when the beacon is generated and transmitted, and a time quality indication indicating a quality of the time source of the transmitting wireless transceiver device. Various additional information related to the wireless data communication system of which the transmitting wireless transceiver device is a part is also optionally included in the beacon.

At block 406, the beacon is transmitted. The beacon includes the timestamp of the transmitting wireless transceiver device, and a time quality indication indicating a quality of the time source of the transmitting wireless transceiver device. The beacon is received by one or more other wireless transceiver devices in the wireless data communication system.

Figure 5:
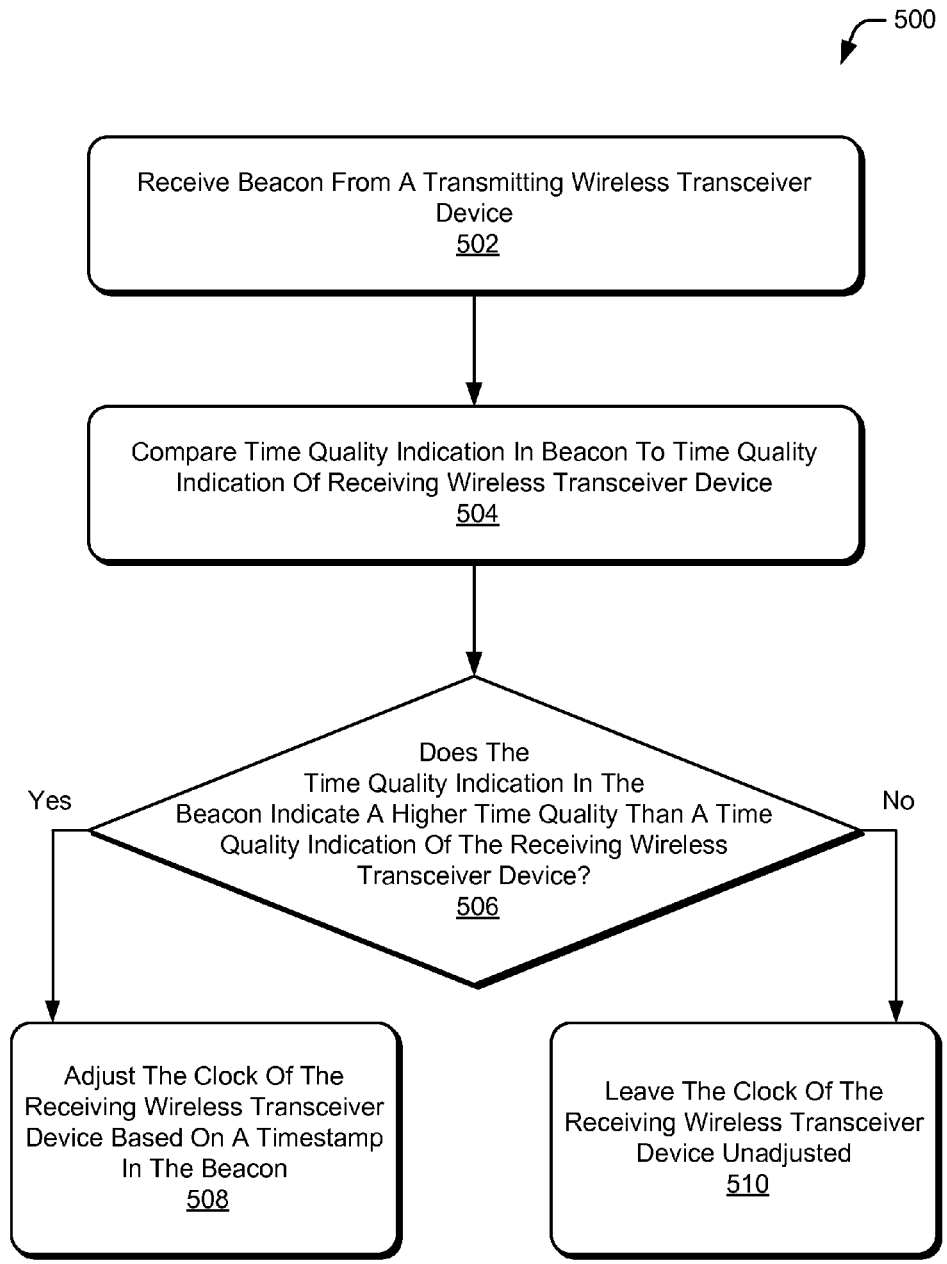
FIG. 5 is a flowchart illustrating an example process for determining whether to adjust a clock based on a received beacon in accordance with one or more embodiments.

FIG. 5 is a flowchart illustrating an example process 500 for determining whether to adjust a clock based on a received beacon in accordance with one or more embodiments. Process 500 is described in the form of a set of blocks that specify operations to be performed, however the operations are not necessarily limited to the order shown. The operations performed by the set of blocks in process 500 are performed by a wireless transceiver device, such as a wireless transceiver device 102, 104, 106, or 108 of FIG. 1. The wireless transceiver device implementing process 500 is also referred to as the receiving wireless transceiver device.

At block 502, a beacon is received from a transmitting wireless transceiver device. The beacon includes a timestamp of the transmitting wireless transceiver device, and a time quality indication indicating a quality of the time source of the transmitting wireless transceiver device at the time the beacon was generated.

At block 504, the time quality indication in the beacon is compared to a time quality indication of the receiving wireless transceiver device. The time quality in the beacon indicates the quality of the time source of the transmitting wireless transceiver device at the time the beacon was transmitted (and thus the accuracy of the timestamp in the beacon), and the time quality in the of the receiving wireless transceiver device indicates a quality of the time source of the receiving wireless transceiver device.

At block 506, a determination is made as to whether the time quality indication in the beacon indicates a higher time quality than a time quality indication of the receiving wireless transceiver device.

At block 508, in response to the time quality indication in the beacon indicating a higher time quality than the time quality indication of the receiving wireless transceiver device, the clock of the receiving wireless transceiver device is adjusted based on the timestamp in the beacon. The clock can be adjusted in various manners as discussed above.

At block 510, in response to the time quality indication in the beacon not indicating a higher time quality than the time quality indication of the receiving wireless transceiver device, the clock of the receiving wireless transceiver device is left unadjusted. No adjustment of the clock of the receiving wireless transceiver device need be performed based on the timestamp in the beacon. It should be noted that the clock being left unadjusted at block 510 refers to the clock not being adjusted based on the timestamp in the beacon—the clock is still automatically updated based on the time source of the beacon based clock system.

The techniques discussed herein support various different usage scenarios. For example, even though the wireless data communication system uses an asynchronous communication protocol, using the techniques discussed herein the wireless transceiver devices in a wireless data communication system will be close (e.g., within a threshold amount of time) of being synchronized to the same date and time. This remains true even for devices moving among wireless data communication systems. E.g., using the techniques discussed herein a wireless transceiver device can move from one wireless data communication system to another and be synchronized to the same time and date as the wireless transceiver devices in each wireless data communication system.

By way of another example, the techniques discussed herein allow different wireless transceiver devices to operate in conjunction with one another in a wireless data communication system. Each wireless transceiver device is synchronized to the same time and date, and thus can coordinate with each other more easily to determine which is to transmit beacons or when beacons are transmitted.

Although the beacon is discussed herein as including a timestamp and time quality indication, alternatively the beacon need not include the time quality indication. Rather, the beacon can include the timestamp and the beacon based clock system of the receiving wireless transceiver device can use other criteria or rules to determine whether to adjust the clock of the receiving wireless transceiver device based on the timestamp. For example, the receiving wireless transceiver device may make an assumption regarding the quality of the time source of the wireless transceiver device from which the beacon is received, such as determining that the quality of the time source of the wireless transceiver device from which the beacon is received is likely to be higher than that of the time source of the receiving wireless transceiver device and thus the clock of the receiving wireless transceiver device is adjusted based on the timestamp in the beacon.

Additionally, although the beacon based clock system is discussed as including a time source, in some situations a wireless transceiver device includes no time source. Rather, the beacon based clock system of the receiving wireless transceiver device can simply adjust the clock of the receiving wireless transceiver device based on the timestamp in a beacon each time a beacon is received.

Figure 6:
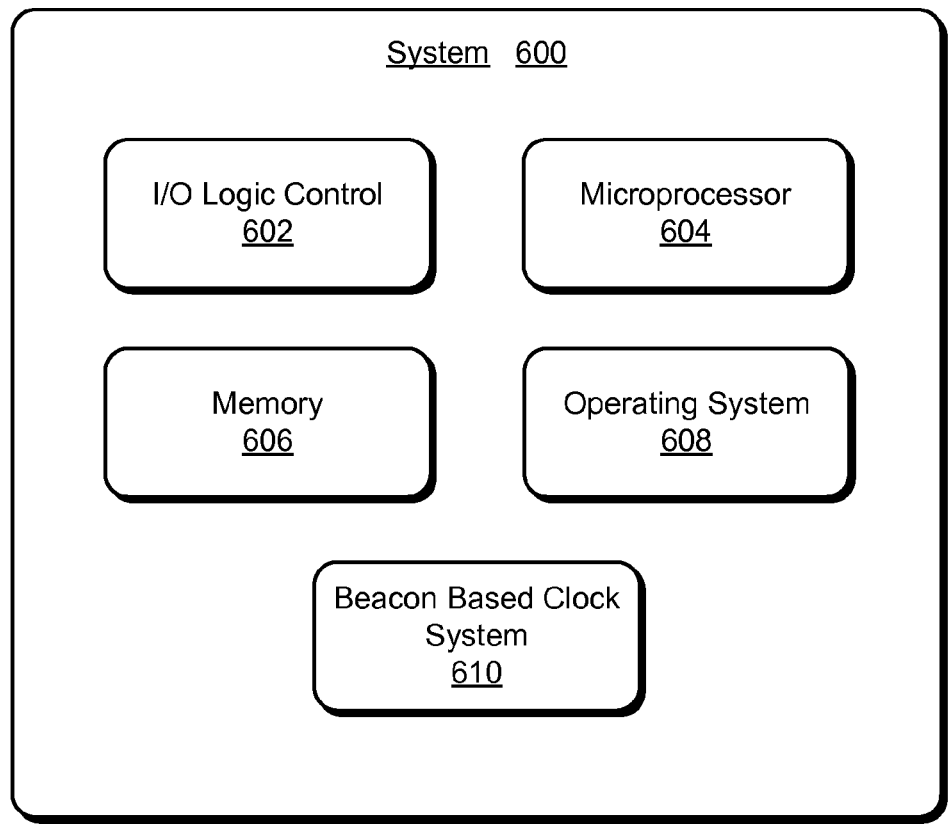
FIG. 6 illustrates an example system that can implement various aspects of the techniques described herein.

FIG. 6 illustrates an example system 600 that can implement various aspects of the techniques described herein. System 600 can be implemented in a variety of different devices, such as one or a combination of a media device, computer device, television set-top box, video processing and/or rendering device, Ethernet interface, switch, appliance device, gaming device, electronic device, vehicle, workstation, smart phone, tablet, and/or in any other type of computing device. System 600 can be implemented as a System-on-Chip (SoC).

System 600 can include electronic circuitry, a microprocessor, memory, input-output (I/O) logic control, communication interfaces and components, other hardware, firmware, and/or software needed to run a device. System 600 can also include an integrated data bus (not shown) that couples the various components of the system for data communication between the components. A wireless communication device that includes system 600 can also be implemented with many combinations of differing components.

In this example, system 600 includes various components such as an input-output (I/O) logic control 602 (e.g., to include electronic circuitry) and a microprocessor 604 (e.g., any of a microcontroller or digital signal processor). System 600 also includes a memory 606, which can be any type and/or combination of RAM, low-latency nonvolatile memory (e.g., Flash memory), ROM, one-time programmable memory, and/or other suitable electronic data storage. Alternately or additionally, system 600 may comprise a memory interface for accessing additional or expandable off-chip memory, such as an external Flash memory module. System 600 can also include various firmware and/or software, such as an operating system 608, which can be computer-executable instructions maintained by memory 606 and executed by microprocessor 604. System 600 may also include other various communication interfaces and components, communication components, other hardware, firmware, and/or software, and so forth.

System 600 also includes a beacon based clock system 610 that evaluates time quality indications of received beacons as discussed herein. The beacon based clock system 610 can be, for example, a beacon based clock system 122, 124, 126, or 128 of FIG. 1, or a beacon based clock system 200 of FIG. 2. The beacon based clock system 610 can be implemented in hardware, firmware, software, or combinations thereof.

One or more of the methods or techniques described above can take the form of a computer program product accessible from a computer-usable or computer-readable medium providing program code for use by or in connection with a computer or any instruction execution system. For the purposes of this description, a computer-usable or computer-readable medium can be any apparatus that can tangibly store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium can include computer-readable memory devices, which can be any of the devices or mediums discussed above, although excludes signals, signal transmission, and carrier waves.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method implemented in a first wireless transceiver device of a wireless data communication system, the method comprising:
   receiving, from a second wireless transceiver device of the wireless data communication system, a first beacon that identifies (i) when the first wireless transceiver device is to listen for data and (ii) when the first wireless transceiver device is to send data, wherein the first beacon further includes a timestamp;
   obtaining, from the first beacon, a time quality of a time source of the second wireless transceiver device, wherein the time quality of the time source of the second wireless transceiver device indicates how accurately the time source of the second wireless transceiver device reflects real time, the time quality of the time source of the second wireless transceiver device based at least in part on state characteristics of the second wireless transceiver device, the state characteristics of the second wireless transceiver device including:
      whether the second wireless transceiver device has been asleep for at least a threshold amount of time;
      whether the second wireless transceiver device has been in a low-power mode for at least a threshold amount of time;
      whether the second wireless transceiver device is plugged in; or
      whether the second wireless transceiver device is operating on battery power;
   determining a time quality of a time source of the first wireless transceiver device, wherein the time quality of the time source of the first wireless transceiver device indicates how accurately the time source of the first wireless transceiver device reflects real time;
   adjusting, based on the timestamp in the first beacon, a clock of the first wireless transceiver device in response to the time source of the second wireless transceiver device reflecting real time more accurately than the time source of the first wireless transceiver device; and
   leaving the clock of the first wireless transceiver device unadjusted in response to the time source of the first wireless transceiver device reflecting real time more accurately than the time source of the second wireless transceiver device.

2. The method of claim 1, further comprising:
   at a predetermined time subsequent to receiving the first beacon, generating a second beacon that includes a timestamp indicating a current time and date of the first wireless transceiver device as well as an indication of the time quality of the time source of the first wireless transceiver device; and
   transmitting the second beacon in the wireless data communication system.

3. The method of claim 1, wherein the adjusting comprises updating the clock of the first wireless transceiver device to be the same as the date and time indicated in the timestamp in the first beacon.

4. The method of claim 1, wherein the wireless data communication system includes a Wi-Fi network, and the timestamp is included as a Timing Synchronization Function value in the first beacon.

5. The method of claim 1, wherein the timestamp comprises a current date and time of the second wireless transceiver device when the first beacon was transmitted.

6. The method of claim 1, wherein the time quality of the time source of the first wireless transceiver device is based at least in part on whether the time source of the first wireless transceiver device is a component receiving signals from devices external to the first wireless transceiver device.

7. The method of claim 6, wherein the signals from devices external to the first wireless transceiver device comprise Global Positioning System signals received from one or more satellites or signals from a cellular phone system.

8. The method of claim 1, wherein the state characteristics of the second wireless transceiver device comprises whether the second wireless transceiver device has been in a low-power mode for at least a threshold amount of time.

9. The method of claim 1, wherein the state characteristics of the second wireless transceiver device comprises whether the second wireless transceiver device is plugged in.

10. The method of claim 1, wherein the state characteristics of the second wireless transceiver device comprises whether the second wireless device has been asleep for at least a threshold amount of time.

11. The method of claim 1, wherein the state characteristics of the second wireless transceiver device comprises whether the second wireless transceiver device is operating on battery power.

12. A first wireless transceiver device of a wireless data communication system, the first wireless transceiver device comprising:
   a transceiver configured to receive, from a second wireless transceiver device of the wireless data communication system, a first beacon that identifies (i) when the first wireless transceiver device is to listen for data and (ii) when the first wireless transceiver device is to send data, wherein the first beacon further includes a timestamp; and
   a beacon based clock system configured to:
      obtain, from the first beacon, a time quality of a time source of the second wireless transceiver device, wherein the time quality of the time source of the second wireless transceiver device indicates how accurately the time source of the second wireless transceiver device reflects real time, the time quality of the time source of the second wireless transceiver device based at least in part on state characteristics of the second wireless transceiver device, the state characteristics of the second wireless transceiver device including:
         whether the second wireless transceiver device has been asleep for at least a threshold amount of time;
         whether the second wireless transceiver device has been in a low-power mode for at least a threshold amount of time;
         whether the second wireless transceiver device is plugged in; or whether the second wireless transceiver device is
operating on battery power;
determine a time quality of a time source of the first
wireless transceiver device, wherein the time quality
of the time source of the first wireless transceiver
device indicates how accurately the time source of
the first wireless transceiver device reflects real time;
adjust, based on the timestamp in the first beacon, a
clock of the first wireless transceiver device in
response to the time source of the second wireless
transceiver device reflecting real time more accurately than the time source of the first wireless
transceiver device; and
leave the clock of the first wireless transceiver device
unadjusted in response to the time source of the first
wireless transceiver device reflecting real time more
accurately than the time source of the second wireless transceiver device.

13. The first wireless transceiver device of claim 12,
the beacon based clock system being further configured to generate, at a predetermined time subsequent to receiving the first beacon, a second beacon that includes a timestamp indicating a current time and date of the first wireless transceiver device as well as an indication of the time quality of the time source of the first wireless transceiver device; and
the transceiver being further configured to transmit the second beacon in the wireless data communication system.

14. The first wireless transceiver device of claim 12, wherein to adjust the clock is to update the clock of the first wireless transceiver device to be the same as the date and time indicated in the timestamp in the first beacon.

15. The first wireless transceiver device of claim 12, wherein the wireless data communication system includes a Wi-Fi network, and the timestamp is included as a Timing Synchronization Function value in the first beacon.

16. The first wireless transceiver device of claim 12, wherein the timestamp comprises a current date and time of the second wireless transceiver device when the first beacon was transmitted.

17. The first wireless transceiver device of claim 12, wherein the state characteristics of the second wireless transceiver device comprises whether the second wireless transceiver device has been in a low-power mode for at least a threshold amount of time.

18. The first wireless transceiver device of claim 12, wherein the state characteristics of the second wireless transceiver device comprises whether the second wireless transceiver device is plugged in.

19. The first wireless transceiver device of claim 12, wherein the state characteristics of the second wireless transceiver device comprises whether the second wireless device has been asleep for at least a threshold amount of time.

20. The first wireless transceiver device of claim 12, wherein the state characteristics of the second wireless transceiver device comprises whether the second wireless transceiver device is operating on battery power.

21. A non-transitory computer-readable memory device comprising computer-executable instructions that, when executed, implement a system in a first wireless transceiver device of an wireless data communication system to:
receive, from a second wireless transceiver device of the wireless data communication system, a first beacon that identifies (i) when the first wireless transceiver device is to listen for data and (ii) when the first wireless transceiver device is to send data, wherein the first beacon further includes a timestamp;
obtain, from the first beacon, a time quality of a time source of the second wireless transceiver device, wherein the time quality of the time source of the second wireless transceiver device indicates how accurately the time source of the second wireless transceiver device reflects real time, the time quality of the time source of the second wireless transceiver device based at least in part on state characteristics of the second wireless transceiver device, the state characteristics of the second wireless transceiver device including:
whether the second wireless transceiver device has been asleep for at least a threshold amount of time;
whether the second wireless transceiver device has been in a low-power mode for at least a threshold amount of time;
whether the second wireless transceiver device is plugged in; or
whether the second wireless transceiver device is operating on battery power;
determine a time quality of a time source of the first wireless transceiver device, wherein the time quality of the time source of the first wireless transceiver device indicates how accurately the time source of the first wireless transceiver device reflects real time;
adjust, based on the timestamp in the first beacon, a clock of the first wireless transceiver device in response to the time source of the second wireless transceiver device reflecting real time more accurately than the time source of the first wireless transceiver device; and
leave the clock of the first wireless transceiver device unadjusted in response to the time source of the first wireless transceiver device reflecting real time more accurately than the time source of the second wireless transceiver device.

22. The non-transitory computer-readable memory device of claim 21, wherein to adjust the clock is to update the clock of the first wireless transceiver device to be the same as the date and time indicated in the timestamp in the first beacon.

23. The non-transitory computer-readable memory device of claim 21, wherein the wireless data communication system includes a Wi-Fi network, and the timestamp is included as a Timing Synchronization Function value in the first beacon.

24. The non-transitory computer-readable memory device of claim 21, wherein the timestamp comprises a current date and time of the second wireless transceiver device when the first beacon was transmitted.

\* \* \* \* \*